United States Patent
Aoki et al.

(10) Patent No.: US 12,142,763 B2
(45) Date of Patent: Nov. 12, 2024

(54) POSITIVE ELECTRODE ACTIVE MATERIAL FOR NON-AQUEOUS ELECTROLYTE SECONDARY CELL, AND NON-AQUEOUS ELECTROLYTE SECONDARY CELL

(71) Applicant: Panasonic Intellectual Property Management Co., Ltd., Kadoma (JP)

(72) Inventors: Yoshinori Aoki, Osaka (JP); Takeshi Ogasawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/380,679

(22) Filed: Oct. 17, 2023

(65) Prior Publication Data
US 2024/0058675 A1    Feb. 22, 2024

Related U.S. Application Data

(63) Continuation of application No. 16/957,143, filed as application No. PCT/JP2018/046218 on Dec. 17, 2018, now Pat. No. 11,831,013.

(30) Foreign Application Priority Data

Dec. 26, 2017 (JP) ................... 2017-249717

(51) Int. Cl.
*H01M 4/525* (2010.01)
*A63B 69/00* (2006.01)
*A63B 102/26* (2015.01)
*H01M 4/02* (2006.01)

(52) U.S. Cl.
CPC ........ *H01M 4/525* (2013.01); *A63B 69/0026* (2013.01); *A63B 2102/26* (2015.10); *A63B 2220/17* (2013.01); *A63B 2220/833* (2013.01); *A63B 2225/74* (2020.08); *H01M 2004/027* (2013.01)

(58) Field of Classification Search
CPC ............. H01M 4/525; H01M 2004/027; C01P 2002/20; C01P 2002/52; C01P 2002/54; C01P 2002/60; C01P 2002/70; C01P 2002/72; C01P 2002/76; C01P 2002/77; C01G 53/42; C01G 53/00; Y02E 60/10
See application file for complete search history.

(56) References Cited

U.S. PATENT DOCUMENTS

| | | |
|---|---|---|
| 5,792,574 A | 8/1998 | Mitate et al. |
| 2009/0035659 A1 | 2/2009 | Takeuchi et al. |
| 2016/0172674 A1 | 6/2016 | Oda et al. |
| 2017/0054147 A1 | 2/2017 | Yokoyama et al. |
| 2019/0190018 A1 | 6/2019 | Aoki et al. |

FOREIGN PATENT DOCUMENTS

| | | |
|---|---|---|
| EP | 3024068 A1 | 5/2016 |
| JP | H09-298061 A | 11/1997 |
| JP | H10-321228 A | 12/1998 |
| JP | 2000-030693 A | 1/2000 |
| JP | 2000-133262 A | 5/2000 |
| JP | 2004-127675 A | 4/2004 |
| JP | 2004-253174 A | 9/2004 |
| JP | 2006-310181 A | 11/2006 |
| JP | 2015-26454 A | 2/2015 |
| WO | 2018/043190 A1 | 3/2018 |

OTHER PUBLICATIONS

International Search Report dated Mar. 12, 2019, issued in counterpart application No. PCT/JP2018/046218, with English translation. (4 pages).
The Extended European Search Report dated Feb. 4, 2021, issued in counterpart EP Application No. 18897658.3. (39 pages).
Guilmard M et al: "Structural and electrochemical properties of LiNi0.70Co0.15Al0.15O2", Solid State Ionics, North Holland Pub. Company. Amsterdam; NL, NL, vol. 160, No. 1-2, May 2003 (May 2003), pp. 39-50, XP004430496; Cited in Extended European Search report dated Feb. 4, 2021. (12 pages).

*Primary Examiner* — Cynthia K Walls
(74) *Attorney, Agent, or Firm* — WHDA, LLP

(57) ABSTRACT

The positive electrode active material for a non-aqueous electrolyte secondary cell according to an embodiment of the present disclosure is characterized in having a Ni-containing lithium transition metal oxide having a layered structure; the proportion of Ni in the lithium transition metal oxide being 91 to 96 mol % relative to the total number of moles of metal elements excluding Li; a transition metal being present in the Li layer of the layered structure at an amount of 1 to 2.5 mol % relative to the total number of moles of transition metals in the Ni-containing lithium transition metal oxide; and the Ni-containing lithium transition metal oxide being such that the half width n of the diffraction peak for the (208) plane in an X-ray diffraction pattern obtained by X-ray diffraction is $0.30° \leq n \leq 0.50°$.

5 Claims, No Drawings

POSITIVE ELECTRODE ACTIVE MATERIAL FOR NON-AQUEOUS ELECTROLYTE SECONDARY CELL, AND NON-AQUEOUS ELECTROLYTE SECONDARY CELL

CROSS-REFERENCE TO RELATED APPLICATIONS

This is a Continuation of U.S. patent application Ser. No. 16/957,143 filed Jun. 23, 2020, which is a National Stage Entry of International Application No. PCT/JP2018/046218 filed Dec. 17, 2018, which claims the benefit of Japanese Patent Application No. 2017-249717 filed in the Japan Patent Office on Dec. 26, 2017, each of which is incorporated by reference herein in its entirety.

TECHNICAL FIELD

The present invention relates to techniques for a positive electrode active material for a non-aqueous electrolyte secondary battery, and a non-aqueous electrolyte secondary battery.

BACKGROUND ART

Recently, a non-aqueous electrolyte secondary battery comprising a positive electrode, a negative electrode and a non-aqueous electrolyte, in which charge/discharge is performed by movement of lithium ions and the like between the positive electrode and the negative electrode, has been used widely as a high-output and high-energy density secondary battery.

The followings are, for example, known as positive electrode active materials for use in positive electrodes of non-aqueous electrolyte secondary batteries.

For example, Patent Literature 1 discloses a positive electrode active material which is represented by compositional formula $Li_aNi_bCo_cMn_dO_2$ (which satisfies $0.1 \leq a \leq 1.2$, $0.40 \leq b < 1.15$, $0 < c < 0.60$ and $0 < d < 0.60$, and has relationships of $1.00 \leq b+c+d \leq 1.15$ and $0 < c+d \leq 0.60$) and which is made of a composite oxide where the transition metal occupancy e in a Li layer is in the range of $0.006 \leq e \leq 0.150$.

For example, Patent Literature 2 discloses a positive electrode active material represented by $[Li]_{3a}[Ni_{1-x-y}Co_x Al_y]_{3b}[O_2]_{6c}$ (wherein the index of each [ ] represents a site, and x and y satisfy conditions of $0 < x \leq 0.20$ and $0 < y \leq 0.15$), in which the site occupancy of ions of any metal other than lithium at the 3a site, as obtained from Rietveld analysis of an X-ray diffraction pattern, in a hexagonal lithium nickel composite oxide having a layered structure is 3% or less, the average particle size of primary particles is 0.1 μm or more, and a plurality of such primary particles are collected to form secondary particles.

CITATION LIST

Patent Literatures

PATENT LITERATURE 1: Japanese Unexamined Patent Application Publication No. 2000-133262
PATENT LITERATURE 2: Japanese Unexamined Patent Application Publication No. 2000-30693

SUMMARY

Meanwhile, in a case where a lithium transition metal oxide in which the proportion of Ni relative to the total number of moles of metal elements except for Li is 91 mol % or more is used as a positive electrode active material, a problem is that, although an increase in capacity of a non-aqueous electrolyte secondary battery may be achieved, charge/discharge cycle characteristics are remarkably deteriorated.

It is an advantage of the present disclosure to provide a positive electrode active material for a non-aqueous electrolyte secondary battery and a non-aqueous electrolyte secondary battery, in which the non-aqueous electrolyte secondary battery may be inhibited from being deteriorated in charge/discharge cycle characteristics in the case of use of a lithium transition metal oxide in which the proportion of Ni relative to the total number of moles of metal elements except for is Li 91 mol % or more.

A positive electrode active material for a non-aqueous electrolyte secondary battery according to one aspect of the present disclosure has a Ni-containing lithium transition metal oxide having a layered structure, wherein a proportion of Ni in the lithium transition metal oxide is 91 mol % to 99 mol % relative to the total number of moles of metal elements except for Li, 1 mol % to 2.5 mol % of transition metals are present in a Li layer of the layered structure, relative to the total molar amount of transition metals in the Ni-containing lithium transition metal oxide, and a half width n of a diffraction peak of the (208) plane of the Ni-containing lithium transition metal oxide, in an X-ray diffraction pattern with X-ray diffraction, is $0.30° \leq n \leq 0.50°$.

A non-aqueous electrolyte secondary battery according to one aspect of the present disclosure comprises a positive electrode having the positive electrode active material for a non-aqueous electrolyte secondary battery.

According to one aspect of the present disclosure, deterioration in charge/discharge cycle characteristics can be suppressed.

DESCRIPTION OF EMBODIMENTS (Findings Underlying Present Disclosure)

As described above, a lithium transition metal oxide in which the proportion of Ni is 91 mol % or more relative to the total number of moles of metal elements except for Li is used as a positive electrode active material to thereby cause charge/discharge cycle characteristics to be remarkably deteriorated. The present inventors have then made studies, and as a result, have found that a Ni-containing lithium transition metal oxide having a layered structure, in which the proportion of Ni is in the range from 91 mol % to 99 mol %, has charge/discharge cycle characteristics deeply linked with the amount of transition metals in a Li layer of the layered structure and the half width n of the diffraction peak of the (208) plane, in an X-ray diffraction pattern, and have conceived a positive electrode active material for a non-aqueous electrolyte secondary battery according to each aspect described below.

A positive electrode active material for a non-aqueous electrolyte secondary battery according to one aspect of the present disclosure has a Ni-containing lithium transition metal oxide having a layered structure, wherein the proportion of Ni in the lithium transition metal oxide is 91 mol % to 99 mol % relative to the total number of moles of metal elements except for Li, 1 mol % to 2.5 mol % of transition metals are present in a Li layer of the layered structure, relative to the total molar amount of transition metals in the Ni-containing lithium transition metal oxide, and the half width n of the diffraction peak of the (208) plane, in an X-ray diffraction pattern with X-ray diffraction, is $0.30° \leq n \leq 0.50°$.

The layered structure of the Ni-containing lithium transition metal oxide, in which a transition metal layer of Ni and/or the like, a Li layer and an oxygen layer are present and Li ions present in the Li layer reversibly move in and out, thus allows a charge/discharge reaction of a battery to progress. Any Ni-containing lithium transition metal oxide in which the proportion of Ni is in the range from 91 mol % to 99 mol % causes many Li ions to be extracted from a Li layer in discharge of a battery, thereby resulting in an unstable layered structure and deterioration in charge/discharge cycle characteristics. However, the positive electrode active material for a non-aqueous electrolyte secondary battery according to one aspect of the present disclosure, in which the above predetermined amount of transition metals are present in the Li layer of the layered structure, is presumed to allow for keeping of the Li layer by the predetermined amount of transition metals present in the Li layer even if many Li ions are extracted from the Li layer in discharge of a battery, and thus to achieve stabilization of the layered structure and be suppressed in deterioration in charge/discharge cycle characteristics. While the transition metals present in the Li layer of the layered structure of the Ni-containing lithium transition metal oxide of the present disclosure are here mainly Ni, any transition metal other than Ni included in the Ni-containing lithium transition metal oxide may also be present in the Li layer.

The half width of the diffraction peak of the (208) plane, in an X-ray diffraction pattern with X-ray diffraction, is an index representing the fluctuation in arrangement between the Li layer and the transition metal layer of the layered structure. A too small half width results in small fluctuation in arrangement between the Li layer and the transition metal layer and strong binding of Li ions in the Li layer, leading to deterioration in charge/discharge cycle characteristics. It, however, is considered that the positive electrode active material for a non-aqueous electrolyte secondary battery according to one aspect of the present disclosure, in which the half width of the diffraction peak of the (208) plane is in the above predetermined range, is properly fluctuated in arrangement between the Li layer and the transition metal layer of the layered structure and is relaxed in binding of Li ions in the Li layer to some extent, and thus is smooth in movement in and out of Li ions in the Li layer in a charge/discharge reaction and is suppressed in deterioration in charge/discharge cycle characteristics.

Hereinafter, one example of a non-aqueous electrolyte secondary battery using a positive electrode active material for a non-aqueous electrolyte secondary battery according to one aspect of the present disclosure will be described.

A non-aqueous electrolyte secondary battery according to one example of an embodiment comprises a positive electrode, a negative electrode and a non-aqueous electrolyte. A separator is suitably provided between the positive electrode and the negative electrode. Specifically, the secondary battery has a structure where a wound electrode assembly formed by winding the positive electrode and the negative electrode with the separator being interposed therebetween, and the non-aqueous electrolyte are housed in an outer package. The electrode assembly is not limited to such a wound electrode assembly, and other form of an electrode assembly, such as a stacked electrode assembly formed by stacking the positive electrode and the negative electrode with the separator being interposed therebetween, may also be applied. The form of the non-aqueous electrolyte secondary battery is not particularly limited, and examples can include cylindrical, square, coin, button, and laminate forms.

Hereinafter, the positive electrode, the negative electrode, the non-aqueous electrolyte and the separator for use in the non-aqueous electrolyte secondary battery according to one example of an embodiment will be described in detail.

<Positive Electrode>

The positive electrode is configured from, for example, a positive electrode current collector such as metal foil and a positive electrode active material layer formed on the positive electrode current collector. The positive electrode current collector which can be here used is, for example, any foil of a metal which is stable in the potential range of the positive electrode, such as aluminum, or any film obtained by placing such a metal on a surface layer. The positive electrode active material layer includes, for example, a positive electrode active material, a binder, a conductive agent, and the like.

The positive electrode is obtained by, for example, applying a positive electrode mixture slurry including a positive electrode active material, a binder, a conductive agent, and the like onto the positive electrode current collector and drying the resultant, thereby forming a positive electrode active material layer on the positive electrode current collector, and rolling the positive electrode active material layer.

The positive electrode active material includes a Ni-containing lithium transition metal oxide having a layered structure. The proportion of Ni in the lithium transition metal oxide, relative to the total number of moles of metal elements except for lithium, is in the range from 91 mol % to 99 mol %, preferably in the range from 91 mol % to 96 mol % from the viewpoints of, for example, an increase in capacity of a battery and suppression of deterioration in charge/discharge cycle characteristics. In a case where the proportion of Ni is more than 99 mol %, deterioration in charge/discharge cycle characteristics cannot be sufficiently suppressed even if the amount of transition metals in a Li layer of the layered structure and the half width n of the diffraction peak of the (208) plane, in an X-ray diffraction pattern with X-ray diffraction, are in respective specific ranges described below. In a case where the proportion of Ni is less than 91 mol %, an increase in capacity of a battery is inherently difficult to achieve.

Examples of the layered structure of the Ni-containing lithium transition metal oxide include a layered structure belonging to the space group R-3m and a layered structure belonging to the space group C2/m. In particular, a layered structure belonging to the space group R-3m is preferable from the viewpoints of, for example, an increase in capacity and stability of a crystal structure.

The Ni-containing lithium transition metal oxide preferably includes Al from the viewpoint of, for example, suppression of deterioration in charge/discharge cycle characteristics. Al, for example, may be uniformly dispersed in the layered structure of the Ni-containing lithium transition metal oxide, or may be present in a portion of the layered structure. Some Al included in the layered structure may be precipitated on surfaces of particles of the Ni-containing lithium transition metal oxide at the stage of production of the Ni-containing lithium transition metal oxide, and such Al precipitated is also Al included in the Ni-containing lithium transition metal oxide.

The Ni-containing lithium transition metal oxide may include any element other than Al, and is represented by, for example, the following general formula.

$$Li_zNi_xM_{1-x-y}Al_yO_2 \quad (1)$$

In the formula, x representing the proportion of Ni in the Ni-containing lithium transition metal oxide may satisfy 0.91≤x≤0.99, and preferably satisfies 0.91≤x≤0.96 from the viewpoints of, for example, an increase in capacity of a battery and suppression of deterioration in charge/discharge cycle characteristics, as described above.

In the formula, y representing the proportion of Al in the Ni-containing lithium transition metal oxide preferably satisfies 0.04≤y≤0.09, more preferably satisfies 0.04≤y≤0.06 from the viewpoint of, for example, suppression of deterioration in charge/discharge cycle characteristics. A case where y is less than 0.04 may cause charge/discharge cycle characteristics to be deteriorated, as compared with a case where y satisfies the above range, and a case where y is more than 0.09, the proportion of Ni is reduced to result in a reduction in capacity of a non-aqueous electrolyte secondary battery, as compared with a case where y satisfies the above range.

M is not particularly limited as long as M is any element other than Li, Ni and Al, and examples thereof include at least one element selected from the group consisting of Co, Mn, Fe, Mg, Ti, Cr, Cu, Sn, Zr, Nb, Mo, Ta, W, Na, K, Ba, Sr, Bi, Be, Zn, Ca and B. In particular, M is preferably at least one element selected from the group consisting of Co, W, Nb, Mg, Ti, Mn, Zr and Mo from the viewpoint of suppression of deterioration in charge/discharge cycle characteristics.

In the formula, (1−x−y) representing the proportion of M in the Ni-containing lithium transition metal oxide is 0≤(1−x−y).

In the formula, z representing the proportion of Li in Ni-containing lithium transition metal oxide preferably satisfies 0.95≤z≤1.10, more preferably satisfies 0.97≤z≤1.03. A case where z is less than 0.97 may result in a reduction in capacity as compared with a case where z satisfies the above range. A case where z is more than 1.03 causes a Li compound in a larger amount to be added and thus is not sometimes economic in terms of production cost, as compared with a case where z satisfies the above range.

The content of each element constituting the Ni-containing lithium transition metal oxide can be measured by an inductively coupled plasma atomic emission spectrometer (ICP-AES), an electron probe microanalyzer (EPMA), an energy dispersive X-ray analyzer (EDX), and the like.

Transition metals are present in a Li layer of the layered structure of the Ni-containing lithium transition metal oxide. The amount of the transition metals in the Li layer of the layered structure is 1 mol % to 2.5 mol %, preferably 1 mol % to 2 mol % relative to the total molar amount of the transition metals in the layered structure from the viewpoint of suppression of deterioration in charge/discharge cycle characteristics. A case where the amount of the transition metals in the Li layer of the layered structure is less than 1 mol % causes stability of the layered structure with Li ions in the Li layer being extracted, to be deteriorated, and causes charge/discharge cycle characteristics to be deteriorated, as compared with a case where the above range is satisfied. A case where the amount of the transition metals in the Li layer of the layered structure is more than 2.5 mol % causes diffusivity of Li ions in the Li layer to be deteriorated, causing deterioration in battery capacity and polarization degradation due to an increase in resistivity to easily occur, as compared with a case where the above range is satisfied. The transition metals present in the Li layer of the layered structure are mainly Ni, and preferably Ni, Co, Mn, and/or the like.

The amount of the transition metals in the Li layer of the layered structure is determined from the Rietveld analysis result of an X-ray diffraction pattern with X-ray diffraction measurement of the Ni-containing lithium transition metal oxide.

The X-ray diffraction pattern is obtained by using a powder X-ray diffractometer (trade name "RINT-TTR", manufactured by Rigaku Corporation, radiation source Cu—Kα) according to powder X-ray diffractometry in the following conditions.

Measurement range: 15 to 120°
Scanning speed; 4°/min
Analysis range: 30 to 120°
Background; B-spline
Profile function; split pseudo-Voigt function
Binding conditions: Li(3a)+Ni(3a)=1
    Ni(3a)+Ni(3b)=y
ICSD No.; 98-009-4814
    PDXL2 (Rigaku Corporation) which is Rietveld analysis software is used in Rietveld analysis of the X-ray diffraction pattern.

The half width n of the diffraction peak of the (208) plane of the Ni-containing lithium transition metal oxide, in an X-ray diffraction pattern with X-ray diffraction, is 0.30°≤n≤0.50°, preferably 0.30°≤n≤0.45° from the viewpoint of suppression of charge/discharge cycle characteristics. In a case where the half width n of the diffraction peak of the (208) plane is less than 0.30°, binding of Li ions in the Li layer is strong and charge/discharge cycle characteristics are deteriorated, as compared with a case where the above range is satisfied. A case where the half width n of the diffraction peak of the (208) plane is more than 0.50° causes crystallinity of the Ni-containing Li transition metal oxide to be deteriorated and causes the backbone of a crystal structure to be brittle, not to thereby enable a crystal structure, for example, the space group R-3m to be retained, resulting in deterioration in cycle characteristics, as compared with a case where the above range is satisfied.

The crystal structure of the Ni-containing lithium transition metal oxide, determined from the result of the X-ray diffraction pattern with X-ray diffraction, preferably has a lattice constant a representing an a-axis length, in the range of 2.872 Å<a<2.875 Å, and a lattice constant c representing a c-axis length, in the range of 14.18 Å<c<14.21 Å. A case where the lattice constant a is 2.872 Å or less may result in an unstable structure where the atomic distance in the crystal structure is small, and cause charge/discharge cycle characteristics of a battery to be deteriorated, as compared with a case where the above range is satisfied. A case where the lattice constant a is 2.875 Å or more may result in an unstable structure where the atomic distance in the crystal structure is large, and cause output characteristics of a battery to be deteriorated, as compared with a case where the above range is satisfied. A case where the lattice constant c is 14.18 Å or less may result in an unstable structure where the atomic distance in the crystal structure is small, and cause charge/discharge cycle characteristics of a battery to be deteriorated, as compared with a case where the above range is satisfied. A case where the lattice constant c is 14.21 Å or more may result in an unstable structure where the atomic distance in the crystal structure is large, and cause charge/discharge cycle characteristics of a battery to be deteriorated, as compared with a case where the above range is satisfied.

The Ni-containing lithium transition metal oxide preferably has a crystallite size s of 400 Å≤s≤500 Å, as calculated from the half width of a diffraction peak of the (104) plane, in the X-ray diffraction pattern with X-ray diffraction, according to the Scherrer's equation (Scherrer equation). A case where the crystallite size s of the Ni-containing lithium transition metal oxide is less than 400 Å may cause crystallinity to be deteriorated, resulting in deterioration in charge/discharge cycle characteristics of a battery, as compared with a case where the above range is satisfied. A case where the crystallite size s of the Ni-containing lithium transition metal oxide is more than 500 Å may cause diffusivity of Li to be deteriorated and cause output characteristics of a battery to be deteriorated, as compared with a case where the above range is satisfied. The Scherrer's equation is represented by the following equation (2).

$$s = K\lambda/B \cos\theta \qquad (2)$$

In equation (2), s represents the crystallite size, $\lambda$ represents the wavelength of X-ray, B represents the half width of a diffraction peak of the (104) plane, $\theta$ represents the diffraction angle (rad), and K represents the Scherrer constant. In the present embodiment, K is 0.9.

The content of the Ni-containing lithium transition metal oxide is, for example, preferably 90% by mass or more, preferably 99% by mass or more relative to the total mass of the positive electrode active material for a non-aqueous electrolyte secondary battery from the viewpoints of, for example, an enhancement in battery capacity and efficient suppression of deterioration in charge/discharge cycle characteristics.

The positive electrode active material for a non-aqueous electrolyte secondary battery of the present embodiment may include any lithium transition metal oxide other than the Ni-containing lithium transition metal oxide. Examples of such any other lithium transition metal oxide include a lithium transition metal oxide in which the content of Ni is 0 mol % to less than 91 mol %.

One example of the method for producing the Ni-containing lithium transition metal oxide will be described.

The method for producing the Ni-containing lithium transition metal oxide comprises, for example, a first step of obtaining a composite oxide including Ni and any metal element, a second step of mixing the composite oxide obtained in the first step with a Li compound, and a third step of firing the mixture. Each of parameters of the Ni-containing lithium transition metal oxide finally obtained, for example, the amount of transition metals in a Li layer of the layered structure, the half width n of the diffraction peak of the (208) plane, the lattice constant a, the lattice constant c and the crystallite size s is adjusted by controlling, for example, the mixing ratio of raw materials in the second step, and the firing temperature and time in the third step.

In the first step, for example, the composite oxide including Ni and any metal element is obtained by, with stirring of a metal salt solution including Ni and any metal element (Co, Al, Mn, and the like), dropping a solution of an alkali such as sodium hydroxide and adjusting the pH to an alkaline value (for example, 8.5 to 11.5) to thereby precipitate (co-precipitate) a composite hydroxide including Ni and any metal element, and firing the composite hydroxide. The compounding ratio of Ni and any metal element may be appropriately determined so that the proportion of Ni is in the range from 91 mol % to 99 mol %. The firing temperature is not particularly limited, and is, for example, in the range from 500° C. to 600° C.

In the second step, the composite oxide obtained in the first step is mixed with a Li compound, to thereby obtain a mixture. The mixing ratio of the composite oxide obtained in the first step and the Li compound is, for example, preferably any ratio so that the molar ratio of metal elements except for Li:Li is in the range from 1:0.98 to 1:1.15, from the viewpoint that adjustment of each of the parameters to the defined range is facilitated. In the second step, any other metal raw material may be, if necessary, added in mixing of the composite oxide obtained in the first step with the Li compound. Such any other metal raw material is, for example, any oxide including a metal element other than the metal elements constituting the composite oxide obtained in the first step, and Li.

In the third step, the mixture obtained in the second step is fired at a predetermined temperature for a predetermined time to thereby obtain the Ni-containing lithium transition metal oxide according to the present embodiment. The firing of the mixture in the third step is preferably, for example, two-stage firing from the viewpoint that adjustment of each of the parameters to the defined range is facilitated. The firing temperature at the first stage is, for example, preferably in the range from 450° C. to 680° C. The firing temperature at the second stage is preferably a temperature higher than the firing temperature at the first stage, and is, for example, preferably in the range from 700° C. to 800° C. Each of the firing times at the first stage and the second stage is, for example, preferably 3 to 10 hours. The firing of the mixture obtained in the second step is preferably performed in an oxygen gas flow.

The time until the temperature is above the firing temperature at the first stage, with the respect to the firing time in the third step, is preferably 10 hours or less. The time until the temperature is above the firing temperature at the first stage includes the time from the start of temperature rise to the firing temperature at the second stage after completion of the firing at the first stage, until the temperature is below the firing temperature at the first stage after completion of the firing at the second stage. The difference between the firing temperature at the first stage and the firing temperature at the second stage is preferably 40° C. or more and 300° C. or less.

Hereinafter, other materials included in the positive electrode active material layer will be described.

Examples of the conductive agent included in the positive electrode active material layer include carbon powders of carbon black, acetylene black, ketchen black, and graphite. These may be used singly or in combinations of two or more kinds thereof.

Examples of the binder included in the positive electrode active material layer include a fluoropolymer and a rubber-based polymer. Examples of the fluoropolymer include polytetrafluoroethylene (PTFE), polyvinylidene fluoride (PVdF), or any modified product thereof, and examples of the rubber-based polymer include an ethylene-propylene-isoprene copolymer and an ethylene-propylene-butadiene copolymer. These may be used singly or in combinations of two or more kinds thereof.

<Negative Electrode>

The negative electrode comprises, for example, a negative electrode current collector such as metal foil and a negative electrode active material layer formed on the negative electrode current collector. The negative electrode current collector which can be here used is, for example, any foil of a metal which is stable in the potential range of the negative electrode, such as copper, or any film obtained by placing such a metal on a surface layer. The negative electrode active material layer includes, for example, a negative electrode active material, a binder, a thickener, and the like.

The negative electrode is obtained by, for example, applying a negative electrode mixture slurry including a negative electrode active material, a thickener, and a binder onto a negative electrode current collector and drying the resultant, thereby forming a negative electrode active material layer on the negative electrode current collector, and rolling the negative electrode active material layer.

The negative electrode active material included in the negative electrode active material layer is not particularly limited as long as the material can occlude and release lithium ions, and examples thereof include a carbon material, a metal which can form an alloy together with lithium, or an alloy compound including such a metal. The carbon material which can be here used is, for example, any of graphites such as natural graphite, non-graphitizable carbon and artificial graphite, and cokes, and examples of the alloy compound include any compound including at least one metal which can form an alloy together with lithium. Such an element which can form an alloy together with lithium is preferably silicon or tin, and silicon oxide, tin oxide or the like obtained by binding such an element to oxygen can also be used. A mixed product of the carbon material with a silicon or tin compound can be used. Any other than the above can also be used where the charge/discharge potential to metallic lithium such as lithium titanate is higher than that of the carbon material or the like.

The binder included in the negative electrode active material layer, which can be here used, is, for example, a fluoropolymer or a rubber-based polymer, as in the case of the positive electrode, and a styrene-butadiene copolymer (SBR) or a modified product thereof may also be used. The binder included in the negative electrode active material layer, which can be here used, is, for example, a fluororesin, PAN, a polyimide-based resin, an acrylic resin, or a polyolefin-based resin, as in the case of the positive electrode. In a case where the negative electrode mixture slurry is prepared by use of an aqueous solvent, styrene-butadiene rubber (SBR), CMC or a salt thereof, polyacrylic acid (PAA) or a salt thereof (PAA-Na, PAA-K or the like, alternatively, a partially neutralized salt may be adopted), polyvinyl alcohol (PVA), or the like is preferably used.

Examples of the thickener included in the negative electrode active material layer include carboxymethylcellulose (CMC) and polyethylene oxide (PEO). These may be used singly or in combinations of two or more kinds thereof.

<Non-Aqueous Electrolyte>

The non-aqueous electrolyte includes a non-aqueous solvent and an electrolyte salt dissolved in the non-aqueous solvent. The non-aqueous electrolyte is not limited to a liquid electrolyte (non-aqueous electrolytic solution), and may be a solid electrolyte using a gel-like polymer or the like. The non-aqueous solvent which can be used is, for example, any of esters, ethers, nitriles such as acetonitrile, amides such as dimethylformamide, and a mixed solvent of two or more kinds thereof. The non-aqueous solvent may contain a halogen-substituted product obtained by at least partially replacing hydrogen in such a solvent with a halogen atom such as fluorine.

Examples of the esters include cyclic carbonates such as ethylene carbonate (EC), propylene carbonate (PC) and butylene carbonate, linear carbonates such as dimethyl carbonate (DMC), ethyl methyl carbonate (EMC), diethyl carbonate (DEC), methyl propyl carbonate, ethyl propyl carbonate and methyl isopropyl carbonate, cyclic carboxylates such as γ-butyrolactone (GBL) and γ-valerolactone (GVL), and linear carboxylates such as methyl acetate, ethyl acetate, propyl acetate, methyl propionate (MP), ethyl propionate and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ether, and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Any of a fluorinated cyclic carbonate such as fluoroethylene carbonate (FEC), a fluorinated linear carbonate, and a fluorinated linear carboxylate such as methyl fluoropropionate (FMP) is preferably used as the halogen-substituted product.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(B(C_2O_4)F_4)$, $LiPF_{6-x}(C_nF_{2n+1})_x$ ($1<x<6$ and n is 1 or 2), $LiB_{10}Cl_{10}$, $LiCl$, $LiBr$, $LiI$, lithium chloroborane, lithium lower aliphatic carboxylate, borates such as $Li_2B_4O_7$ and $Li(B(C_2O_4)F_2)$, and imide salts such as $LiN(SO_2CF_3)_2$, $LiN(C_1F_{2l+1}SO_2)(C_mF_{2m+1}SO_2)$ {1 and m are each an integer of 0 or more}. Such lithium salts may be used singly or in combinations of two or more kinds thereof. In particular, $LiPF_6$ is preferably used from the viewpoints of ion conductivity, electrochemical stability, and the like. The concentration of the lithium salt is preferably 0.8 to 1.8 mol per liter of the non-aqueous solvent.

<Separator>

The separator here used is, for example, a porous sheet having ion permeability and insulating properties. Examples of the porous sheet include a microporous thin film, a woven cloth, and an unwoven cloth. The material of the separator is suitably an olefin-based resin such as polyethylene or polypropylene, cellulose, or the like. The separator here used may be a stacked article having a cellulose fiber layer and a thermoplastic resin fiber layer of an olefin-based resin or the like, or may be one obtained by applying an aramid resin or the like to the surface of the separator. A filler layer including an inorganic filler may also be formed at the interface between the separator and at least one of the positive electrode and the negative electrode. Examples of the inorganic filler include an oxide containing at least one of titanium (Ti), aluminum (Al), silicon (Si) and magnesium (Mg), a phosphoric acid compound, and such a compound whose surface is treated with a hydroxide or the like. The filler layer can be formed by, for example, applying a slurry containing the filler onto the surface of the positive electrode, the negative electrode or the separator.

EXAMPLES

Hereinafter, the present invention will be further described with reference to Examples, but the present invention is not intended to be limited to such Examples.

Example 1

[Production of Positive Electrode Active Material]

A composite hydroxide represented by $[Ni_{0.955}Al_{0.045}](OH)_2$, obtained according to a co-precipitation method, was fired at 500° C. for 2 hours, thereby obtaining a composite oxide including Ni and Al(Ni$_{0.955}$Al$_{0.045}$O$_2$). The composite oxide including Ni and Al was mixed with LiOH so that the molar ratio of the amount of Li:the total amount of Ni and Al was 0.98:1. The mixture was fired in an oxygen gas flow at 670° C. for 5 hours and then fired at 710° C. for 3 hours, and impurities were removed by washing with water, thereby obtaining a Ni-containing lithium transition metal oxide. The time from the start of temperature rise to the firing temperature at the second stage after completion of the firing at the first stage, until the temperature reached the firing temperature at the first stage after completion of the firing at the second stage, was about 4 hours. The composition of the resulting Ni-containing lithium transition metal was determined with an ICP emission spectrometer (trade name "iCAP6300" manufactured by Thermo Fisher Scientific), and as a result, the composition was Li$_{0.97}$Ni$_{0.955}$Al$_{0.0045}$O$_2$. The resultant was adopted as a positive electrode active material of Example 1.

Example 2

A Ni-containing lithium transition metal oxide was produced in the same manner as in Example 1 except that the composite oxide including Ni and Al of Example 1 was mixed with LiOH so that the molar ratio of the amount of Li:the total amount of Ni and Al was 1:1. The composition of the resulting Ni-containing lithium transition metal oxide was Li$_{0.98}$Ni$_{0.955}$Al$_{0.045}$O$_2$. The resultant was adopted as a positive electrode active material of Example 2.

Example 3

A Ni-containing lithium transition metal oxide was produced in the same manner as in Example 1 except that the composite oxide including Ni and Al of Example 1 was mixed with LiOH so that the molar ratio of the amount of Li:the total amount of Ni and Al was 1.03:1. The composition of the resulting Ni-containing lithium transition metal oxide was Li$_{0.99}$Ni$_{0.955}$Al$_{0.045}$O$_2$. The resultant was adopted as a positive electrode active material of Example 3.

Example 4

A composite hydroxide represented by [Ni$_{0.955}$Al$_{0.045}$](OH)$_2$, obtained according to a co-precipitation method, was fired at 500° C. for 2 hours, thereby obtaining a composite oxide including Ni and Al(Ni$_{0.955}$Al$_{0.045}$O$_2$). A Ni-containing lithium transition metal oxide was produced in the same manner as in Example 1 except that the composite oxide including Ni and Al was mixed with LiOH and SiO so that the molar ratio of the amount of Li:the total amount of Ni, Al and Si was 1.05:1. The composition of the resulting Ni-containing lithium transition metal oxide was Li$_{0.99}$Ni$_{0.952}$Al$_{0.45}$Si$_{0.003}$O$_2$. The resultant was adopted as a positive electrode active material of Example 4.

Example 5

A composite hydroxide represented by [Ni$_{0.94}$Co$_{0.015}$Al$_{0.045}$](OH)$_2$, obtained according to a co-precipitation method, was fired at 500° C. for 2 hours, thereby obtaining a composite oxide including Ni, Co and Al(Ni$_{0.94}$Co$_{0.015}$Al$_{0.045}$O$_2$). A Ni-containing lithium transition metal oxide was produced in the same manner as in Example 1 except that the composite oxide including Ni, Co and Al was mixed with LiOH so that the molar ratio of the amount of Li:the total amount of Ni, Co and Al was 0.98:1. The composition of the resulting Ni-containing lithium transition metal oxide was Li$_{0.97}$Ni$_{0.94}$Co$_{0.015}$Al$_{0.045}$O$_2$. The resultant was adopted as a positive electrode active material of Example 5.

Example 6

A Ni-containing lithium transition metal oxide was produced in the same manner as in Example 1 except that the composite oxide including Ni, Co and Al of Example 5 was mixed with LiOH so that the molar ratio of the amount of Li:the total amount of Ni, Co and Al was 1:1. The composition of the resulting Ni-containing lithium transition metal oxide was Li$_{0.98}$Ni$_{0.94}$Co$_{0.015}$Al$_{0.045}$O$_2$. The resultant was adopted as a positive electrode active material of Example 6.

Example 7

A Ni-containing lithium transition metal oxide was produced in the same manner as in Example 1 except that the composite oxide including Ni, Co and Al of Example 5 was mixed with LiOH so that the molar ratio of the amount of Li:the total amount of Ni, Co and Al was 1.03:1. The composition of the resulting Ni-containing lithium transition metal oxide was Li$_{0.99}$Ni$_{0.94}$Co$_{0.015}$Al$_{0.045}$O$_2$. The resultant was adopted as a positive electrode active material of Example 7.

Example 8

A composite hydroxide represented by [Ni$_{0.94}$Co$_{0.015}$Al$_{0.045}$](OH)$_2$, obtained according to a co-precipitation method, was fired at 500° C. for 2 hours, thereby obtaining a composite oxide including Ni, Co and Al(Ni$_{0.94}$Co$_{0.015}$Al$_{0.045}$O$_2$). The composite oxide including Ni, Co and Al was mixed with LiOH and SiO so that the molar ratio of the amount of Li:the total amount of Ni, Co, Al and Si was 1.05:1. A Ni-containing lithium transition metal oxide was produced in the same manner as in Example 1 except for the above. The composition of the resulting Ni-containing lithium transition metal oxide was Li$_{0.98}$Ni$_{0.937}$Co$_{0.015}$Al$_{0.045}$Si$_{0.003}$O$_2$. The resultant was adopted as a positive electrode active material of Example 8.

Example 9

A composite hydroxide represented by [Ni$_{0.94}$Co$_{0.015}$Al$_{0.045}$](OH)$_2$, obtained according to a co-precipitation method, was fired at 500° C. for 2 hours, thereby obtaining a composite oxide including Ni, Co and Al(Ni$_{0.94}$Co$_{0.015}$Al$_{0.045}$O$_2$). The composite oxide including Ni, Co and Al was mixed with LiOH and Ti(OH)$_2$•α-type so that the molar ratio of the amount of Li:the total amount of Ni, Co, Al and Ti was 1.03:1. A Ni-containing lithium transition metal oxide was produced in the same manner as in Example 1 except for the above. The composition of the resulting Ni-containing lithium transition metal oxide was Li$_{0.98}$Ni$_{0.935}$Co$_{0.015}$Al$_{0.045}$Ti$_{0.005}$O$_2$. The resultant was adopted as a positive electrode active material of Example 9.

Example 10

A Ni-containing lithium transition metal oxide was produced in the same manner as in Example 1 except that the composite oxide including Ni, Co and Al of Example 9 was mixed with LiOH and Ti(OH)$_2$α-type so that the molar ratio of the amount of Li:the total amount of Ni, Co, Al and Ti was 1.05:1. The composition of the resulting Ni-containing lithium transition metal oxide was $Li_{0.98}Ni_{0.935}Co_{0.015}Al_{0.045}Ti_{0.005}O_2$. The resultant was adopted as a positive electrode active material of Example 10.

Example 11

A Ni-containing lithium transition metal oxide was produced in the same manner as in Example 1 except that the composite oxide including Ni, Co and Al of Example 9 was mixed with LiOH and $Li_3MoO_4$ so that the molar ratio of the amount of Li:the total amount of Ni, Co, Al and Mo was 1.075:1. The composition of the resulting Ni-containing lithium transition metal oxide was $Li_{0.99}Ni_{0.935}Co_{0.015}Al_{0.045}Mo_{0.005}O_2$. The resultant was adopted as a positive electrode active material of Example 11.

Example 12

A composite hydroxide represented by $[Ni_{0.94}Co_{0.015}Al_{0.045}](OH)_2$, obtained according to a co-precipitation method, was fired at 500° C. for 2 hours, thereby obtaining a composite oxide including Ni, Co and Al($Ni_{0.94}Co_{0.015}Al_{0.045}O_2$). The composite oxide including Ni, Co and Al was mixed with LiOH and $MnO_2$ so that the molar ratio of the amount of Li:the total amount of Ni, Co, Al and Mn was 1.05:1. A Ni-containing lithium transition metal oxide was produced in the same manner as in Example 1 except for the above. The composition of the resulting Ni-containing lithium transition metal oxide was $Li_{0.98}Ni_{0.93}Co_{0.015}Al_{0.045}Mn_{0.01}O_2$. The resultant was adopted as a positive electrode active material of Example 12.

Example 13

A Ni-containing lithium transition metal oxide was produced in the same manner as in Example 1 except that the composite oxide including Ni, Co and Al of Example 12 was mixed with LiOH and $MnO_2$ so that the molar ratio of the amount of Li:the total amount of Ni, Co. Al and Mn was 1.08:1. The composition of the resulting Ni-containing lithium transition metal oxide was $Li_{0.98}Ni_{0.93}Co_{0.015}Al_{0.045}Mn_{0.01}O_2$. The resultant was adopted as a positive electrode active material of Example 13.

Example 14

A Ni-containing lithium transition metal oxide was produced in the same manner as in Example 1 except that the composite oxide including Ni, Co and Al of Example 12 was mixed with LiOH and $LiNbO_3$ so that the molar ratio of the amount of Li:the total amount of Ni, Co, Al and Nb was 1.08:1. The composition of the resulting Ni-containing lithium transition metal oxide was $Li_{0.99}Ni_{0.93}Co_{0.015}Al_{0.045}Nb_{0.01}O_2$. The resultant was adopted as a positive electrode active material of Example 14.

Example 15

A Ni-containing lithium transition metal oxide was produced in the same manner as in Example 1 except that the composite oxide including Ni, Co and Al of Example 12 was mixed with LiOH and $LiNbO_3$ so that the molar ratio of the amount of Li:the total amount of Ni, Co, Al and Nb was 1.10:1. The composition of the resulting Ni-containing lithium transition metal oxide was $Li_{0.99}Ni_{0.93}Co_{0.015}Al_{0.045}Nb_{0.01}O_2$. The resultant was adopted as a positive electrode active material of Example 15.

Example 16

A composite hydroxide represented by $[Ni_{0.91}Co_{0.045}Al_{0.045}](OH)_2$, obtained according to a co-precipitation method, was fired at 500° C. for 2 hours, thereby obtaining a composite oxide including Ni, Co and Al($Ni_{0.91}Co_{0.045}Al_{0.045}O_2$). The composite oxide including Ni, Co and Al was mixed with LiOH so that the molar ratio of the amount of Li:the total amount of Ni, Co and Al was 1.03:1. A Ni-containing lithium transition metal oxide was produced in the same manner as in Example 1 except for the above. The composition of the resulting Ni-containing lithium transition metal oxide was $Li_{1.03}Ni_{0.91}Co_{0.045}Al_{0.045}O_2$. The resultant was adopted as a positive electrode active material of Example 16.

Example 17

A Ni-containing lithium transition metal oxide was produced in the same manner as in Example 1 except that the composite oxide including Ni, Co and Al of Example 12 was mixed with LiOH and $Ti(OH)_2$ α-type so that the molar ratio of the amount of Li:the total amount of Ni, Co, Al and Ti was 1.10:1. The composition of the resulting Ni-containing lithium transition metal oxide was $Li_{0.98}Ni_{0.91}Co_{0.015}Al_{0.045}Ti_{0.003}O_2$. The resultant was adopted as a positive electrode active material of Example 17.

Comparative Example 1

LiOH and NiO were mixed so that the molar ratio of the amount of Li:the amount of Ni was 1.03:1, the mixture was fired in an oxygen gas flow at 670° C. for 5 hours and then fired at 750° C. for 3 hours, and impurities were removed by washing with water, thereby obtaining a Ni-containing lithium transition metal oxide. The time from the start of temperature rise to the firing temperature at the second stage after completion of the firing at the first stage, until the temperature reached the firing temperature at the first stage after completion of the firing at the second stage, was about 5 hours. The composition of the resulting Ni-containing lithium transition metal oxide was $Li_{0.098}Ni_{1.0}O_2$. The resultant was adopted as a positive electrode active material of Comparative Example 1.

Comparative Example 2

The composite oxide including Ni, Co and Al of Example 5 was mixed with LiOH so that the molar ratio of the amount of Li:the total amount of Ni, Co and Al was 1.03:1. The mixture was fired in an oxygen gas flow at 670° C. for 5 hours and then fired at 750° C. for 3 hours, thereby obtaining a Ni-containing lithium transition metal oxide. The composition of the resulting Ni-containing lithium transition metal oxide was $Li_{0.98}Ni_{0.94}Co_{0.015}Al_{0.045}O_2$. The resultant was adopted as a positive electrode active material of Comparative Example 2.

Comparative Example 3

The composite oxide including Ni, Co and Al of Example 12 was mixed with LiOH and $MnO_2$ so that the molar ratio of the amount of Li:the total amount of Ni, Co, Al and Mn was 1.1:1. The mixture was fired in an oxygen gas flow at 670° C. for 5 hours and then fired at 800° C. for 3 hours, thereby obtaining a Ni-containing lithium transition metal oxide. The time from the start of temperature rise to the firing temperature at the second stage after completion of the firing at the first stage, until the temperature reached the firing temperature at the first stage after completion of the firing at the second stage, was about 6 hours. The composition of the resulting Ni-containing lithium transition metal oxide was $Li_{0.98}Ni_{0.93}Co_{0.015}Al_{0.045}Mn_{0.001}O_2$. The resultant was adopted as a positive electrode active material of Comparative Example 3.

Comparative Example 4

The composite oxide including Ni, Co and Al of Example 9 was mixed with LiOH and $Ti(OH)_2$ α-type so that the molar ratio of the amount of Li:the total amount of Ni, Co. Al and Ti was 1.1:1. The mixture was fired in an oxygen gas flow at 670° C. for 5 hours and then fired at 710° C. for 3 hours, thereby obtaining a Ni-containing lithium transition metal oxide. The composition of the resulting Ni-containing lithium transition metal oxide was $Li_{0.99}Ni_{0.935}Co_{0.015}Al_{0.045}Ti_{0.005}O_2$. The resultant was adopted as a positive electrode active material of Comparative Example 4.

Comparative Example 5

The composite oxide including Ni, Co and Al of Example 5 was mixed with LiOH so that the molar ratio of the amount of Li:the total amount of Ni, Co and Al was 1.05:1. The mixture was fired in an oxygen gas flow at 670° C. for 5 hours and then fired at 710° C. for 3 hours, thereby obtaining a Ni-containing lithium transition metal oxide. The composition of the resulting Ni-containing lithium transition metal oxide was $Li_{0.98}Ni_{0.94}Co_{0.015}Al_{0.045}O_2$. The resultant was adopted as a positive electrode active material of Comparative Example 5.

Comparative Example 6

A composite hydroxide represented by $[Ni_{0.88}Co_{0.09}Al_{0.03}](OH)_2$, obtained according to a co-precipitation method, was fired at 500° C. for 2 hours, thereby obtaining a composite oxide including Ni, Co and $Al(Ni_{0.88}Co_{0.09}Al_{0.03}O_2)$. The composite oxide including Ni, Co and Al was mixed with LiOH so that the molar ratio of the amount of Li:the total amount of Ni, Co and Al was 1.03:1. The mixture was fired in an oxygen gas flow at 670° C. for 5 hours and then fired at 750° C. for 3 hours, and impurities were removed by washing with water, thereby obtaining a Ni-containing lithium transition metal oxide. The time from the start of temperature rise to the firing temperature at the second stage after completion of the firing at the first stage, until the temperature reached the firing temperature at the first stage after completion of the firing at the second stage, was about 5 hours. The composition of the resulting Ni-containing lithium transition metal oxide was $Li_{0.98}Ni_{0.88}Co_{0.09}Al_{0.03}O_2$. The resultant was adopted as a positive electrode active material of Comparative Example 6.

Comparative Example 7

A Ni-containing lithium transition metal oxide was produced in the same manner as in Example 6 except that the composite oxide including Ni, Co and Al of Comparative Example 6 was mixed with LiOH so that the molar ratio of the amount of Li:the total amount of Ni. Co and Al was 1.05:1. The composition of the resulting Ni-containing lithium transition metal oxide was $Li_{0.99}Ni_{0.88}Co_{0.09}Al_{0.03}O_2$. The resultant was adopted as a positive electrode active material of Comparative Example 7.

Each of the Ni-containing lithium transition metal oxides (positive electrode active materials) of Examples 1 to 17 and Comparative Examples 1 to 7 was subjected to powder X-ray diffraction measurement in the above-mentioned conditions, thereby obtaining an X-ray diffraction pattern. A diffraction line indicating a layered structure was confirmed in all the respective X-ray diffraction patterns of Examples and Comparative Examples.

The amount of transition metals in a Li layer, the half width n of the diffraction peak of the (208) plane, the lattice constant a, the lattice constant c and the crystallite size s were determined from each of the X-ray diffraction patterns of Examples and Comparative Examples. The results were summarized in Tables 1 and 2. The measurement methods are as described.

TABLE 1

| | | Ni-containing lithium transition metal oxide | | | | |
|---|---|---|---|---|---|---|
| | Elements (mol %) | Amount of transition metals in Li layer (mol %) | Half width of peak diffraction of (208) plane (°) | Lattice constant a (Å) | Lattice constant c (Å) | Crystallite size s (Å) |
| Example 1 | Ni/Al (95.5/4.5) | 2.2 | 0.36 | 2.874 | 14.204 | 471 |
| Example 2 | Ni/Al (95.5/4.5) | 1.7 | 0.34 | 2.875 | 14.202 | 477 |
| Example 3 | Ni/Al (95.5/4.5) | 1.4 | 0.33 | 2.875 | 14.203 | 473 |
| Example 4 | Ni/Al/Si (95.2/4.5/0.3) | 1.8 | 0.31 | 2.875 | 14.207 | 491 |
| Example 5 | Ni/Co/Al (94/1.5/4.5) | 2.3 | 0.40 | 2.873 | 14.200 | 441 |
| Example 6 | Ni/Co/Al (94/1.5/4.5) | 1.8 | 0.31 | 2.873 | 14.199 | 454 |
| Example 7 | Ni/Co/Al 94/1.5/4.5) | 1.0 | 0.31 | 2.873 | 14.199 | 507 |
| Example 8 | Ni/Co/Al/Si (93.7/1.5/4.5/0.3) | 1.7 | 0.34 | 2.872 | 14.198 | 438 |
| Example 9 | Ni/Co/Al/Ti (93.5/1.5/4.5/0.5) | 1.7 | 0.33 | 2.873 | 14.198 | 449 |
| Example 10 | Ni/Co/Al/Ti (93.5/1.5/4.5/0.5) | 1.4 | 0.33 | 2.874 | 14.198 | 493 |
| Example 11 | Ni/Co/Al/Mo (93.5/1.5/4.5/0.5) | 1.1 | 0.37 | 2.871 | 14.190 | 432 |
| Example 12 | Ni/Co/Al/Mn (93/1.5/4.5/1) | 1.8 | 0.44 | 2.873 | 14.193 | 439 |

TABLE 1-continued

| | | Ni-containing lithium transition metal oxide | | | | |
|---|---|---|---|---|---|---|
| | Elements (mol %) | Amount of transition metals in Li layer (mol %) | Half width of peak diffraction of (208) plane (°) | Lattice constant a (Å) | Lattice constant c (Å) | Crystallite size s (Å) |
| Example 13 | Ni/Co/Al/Mn (93/1.5/4.5/1) | 1.3 | 0.49 | 2.874 | 14.197 | 484 |
| Example 14 | Ni/Co/Al/Nb (93/1.5/4.5/1) | 1.7 | 0.37 | 2.875 | 14.204 | 410 |
| Example 15 | Ni/Co/Al/Nb (93/1.5/4.5/1) | 1.5 | 0.48 | 2.875 | 14.204 | 422 |
| Example 16 | Ni/Co/Al (91/4.5/4.5) | 1.1 | 0.38 | 2.872 | 14.195 | 478 |
| Example 17 | Ni/Co/Al/Ti (91/1.5/4.5/3) | 2.2 | 0.39 | 2.875 | 14.208 | 446 |

TABLE 2

| | | Ni-containing lithium transition metal oxide | | | | |
|---|---|---|---|---|---|---|
| | Elements (mol %) | Amount of transition metals in Li layer (mol %) | Half width of diffraction peak of (208) plane (°) | Lattice constant a (Å) | Lattice constant c (Å) | Crystallite size s (Å) |
| Comparative Example 1 | Ni (100) | 1.0 | 0.28 | 2.876 | 14.194 | 579 |
| Comparative Example 2 | Ni/Co/Al (94/1.5/4.5) | 2.9 | 0.27 | 2.877 | 14.203 | 534 |
| Comparative Example 3 | Ni/Co/Al/Mn (93/1.5/4.5/1) | 2.6 | 0.28 | 2.878 | 14.207 | 537 |
| Comparative Example 4 | Ni/Co/Al/Ti (93.5/1.5/4.5/0.5) | 0.9 | 0.36 | 2.874 | 14.199 | 495 |
| Comparative Example 5 | Ni/Co/Al (94/1.5/4.5) | 0.8 | 0.29 | 2.874 | 14.199 | 504 |
| Comparative Example 6 | Ni/Co/Al (88/9/3) | 1.0 | 0.26 | 2.870 | 14.185 | 573 |
| Comparative Example 7 | Ni/Co/Al (88/9/3) | 0.8 | 0.22 | 2.870 | 14.184 | 550 |

Each of the Ni-containing lithium composite oxides (positive electrode active materials) of Examples 1 to 17 and Comparative Examples 1 to 7 was used to produce each test cell as follows.

[Production of Positive Electrode]

Ninety one parts by mass of the positive electrode active material of Example 1, 7 parts by mass of acetylene black as a conductive agent, and 2 parts by mass of polyvinylidene fluoride as a binder were mixed. The mixture was kneaded with a kneader (T.K. HIVIS MIX, manufactured by PRIMIX Corporation), thereby preparing a positive electrode mixture slurry. Next, the positive electrode mixture slurry was applied to aluminum foil having a thickness of 15 µm, and a coating film was dried, thereby forming a positive electrode active material layer on the aluminum foil. The resultant was adopted as a positive electrode of Example 1. The same manner was conducted to produce each positive electrode also in other Examples and Comparative Examples.

[Preparation of Non-Aqueous Electrolyte]

Ethylene carbonate (EC), methyl ethyl carbonate (MEC) and dimethyl carbonate (DMC) were mixed at a volume ratio of 3:3:4. Lithium hexafluorophosphate ($LiPF_6$) was dissolved in such a mixed solvent so that the concentration was 1.2 mol/L, and thus a non-aqueous electrolyte was prepared.

[Production of Test Cell]

The positive electrode of Example 1 and a negative electrode made of lithium metal foil were stacked so that such electrodes were opposite to each other with a separator being interposed therebetween, and the resultant was wound, thereby producing an electrode assembly. Next, the electrode assembly and the non-aqueous electrolyte were inserted into an outer package made of aluminum, thereby producing a test cell. The same manner was conducted to produce each test cell also in other Examples and Comparative Examples.

[Measurement of Capacity Retention in Charge/Discharge Cycle]

After each of the test cells of Examples and Comparative Examples was subjected to constant current charge at a constant current of 0.2 C under an environmental temperature of 25° C. until the battery voltage reached 4.3 V, the test cell was subjected to constant voltage charge at 4.3 V until the current value reached 0.05 mA, and subjected to constant current discharge at a constant current of 0.2 C until the battery voltage reached 2.5 V. The charge/discharge cycle was performed for 20 cycles, and the capacity retention in the charge/discharge cycle of such each of the test cells of Examples and Comparative Examples was determined according to the following equation. A higher value indicated that deterioration in charge/discharge cycle characteristics was more suppressed.

Capacity retention=(Discharge capacity at $20^{th}$ cycle/Discharge capacity at $1^{st}$ cycle)×100

The results of the capacity retention in the charge/discharge cycle of such each of the test cells of Examples and Comparative Examples are shown in Tables 3 and 4.

TABLE 3

| | Ni-containing lithium transition metal oxide | | | Battery characteristics |
|---|---|---|---|---|
| | Elements (mol %) | Amount of transition metals in Li layer (mol %) | Half width of diffraction peak of (208) plane (°) | Capacity retention in charge/discharge cycle (%) |
| Example 1 | Ni/Al 95.5/4.5) | 2.2 | 0.36 | 93.6 |
| Example 2 | Ni/Al (95.5/4.5) | 1.7 | 0.34 | 94.3 |
| Example 3 | Ni/Al 95.5/4.5) | 1.4 | 0.33 | 94.8 |
| Example 4 | Ni/Al/Si (95.2/4.5/0.3) | 1.8 | 0.31 | 99.0 |
| Example 5 | Ni/Co/Al (94/1.5/4.5) | 2.3 | 0.40 | 90.3 |
| Example 6 | Ni/Co/Al (94/1.5/4.5) | 1.8 | 0.31 | 90.7 |
| Example 7 | Ni/Co/Al (94/1.5/4.5) | 1.0 | 0.31 | 91.3 |
| Example 8 | Ni/Co/Al/Si (93.7/1.5/4.5/0.3) | 1.7 | 0.34 | 98.5 |
| Example 9 | Ni/Co/Al/Ti (93.5/1.5/4.5/0.5) | 1.7 | 0.33 | 93.6 |
| Example 10 | Ni/Co/Al/Ti (93.5/1.5/4.5/0.5) | 1.4 | 0.33 | 90.1 |
| Example 11 | Ni/Co/Al/Mo (93.5/1.5/4.5/0.5) | 1.1 | 0.37 | 96.0 |
| Example 12 | Ni/Co/Al/Mn (93/1.5/4.5/1) | 1.8 | 0.44 | 96.6 |
| Example 13 | Ni/Co/Al/Mn (93/1.5/4.5/1) | 1.3 | 0.49 | 94.8 |
| Example 14 | Ni/Co/Al/Nb (93/1.5/4.5/1) | 1.7 | 0.37 | 95.8 |
| Example 15 | Ni/Co/Al/Nb (93/1.5/4.5/1) | 1.5 | 0.48 | 94.4 |
| Example 16 | Ni/Co/Al (91/4.5/4.5) | 1.1 | 0.38 | 98.4 |
| Example 17 | Ni/Co/Al/Ti (91/1.5/4.5/3) | 2.2 | 0.39 | 95.6 |

TABLE 4

| | Ni-containing lithium transition metal oxide | | | Battery characteristics |
|---|---|---|---|---|
| | Elements (mol %) | Amount of transition metals in Li layer (mol %) | Half width of diffraction peak of (208) plane (°) | Capacity retention in charge/discharge cycle (%) |
| Comparative Example 1 | Ni (100) | 1.0 | 0.28 | 85.9 |
| Comparative Example 2 | Ni/Co/Al (94/1.5/4.5) | 2.9 | 0.27 | 83.3 |
| Comparative Example 3 | Ni/Co/Al/Mn (93/1.5/4.5/1) | 2.6 | 0.28 | 75.2 |
| Comparative Example 4 | Ni/Co/Al/Ti (93.5/1.5/4.5/0.5) | 0.9 | 0.36 | 86.8 |
| Comparative Example 5 | Ni/Co/Al (94/1.5/4.5) | 0.8 | 0.29 | 87.6 |
| Comparative Example 6 | Ni/Co/Al (88/9/3) | 1.0 | 0.26 | 97.9 |
| Comparative Example 7 | Ni/Co/Al (88/9/3) | 0.8 | 0.22 | 96.1 |

Each of the positive electrode active materials of Examples 1 to 17 and Comparative Examples 1 to 5 had a Ni-containing lithium transition metal oxide having a layered structure, and the proportion of Ni in the lithium transition metal oxide was 91 mol % or more relative to the total number of moles of metal elements except for Li. In particular, Examples 1 to 17, in which the proportion of Ni in the lithium transition metal oxide was 91 mol % to 99 mol %, 1 to 2.5 mol % of transition metals were present in a Li layer of the layered structure, relative to the total molar amount of transition metals in the Ni-containing lithium transition metal oxide (namely, the amount of transition metals in the Li layer was 1 to 2.5 mol %), and the half width n of the diffraction peak of the (208) plane of the lithium transition metal oxide, in an X-ray diffraction pattern with X-ray diffraction, was 0.30°≤n≤0.50°, were high in capacity retention and were suppressed in deterioration in charge/discharge cycle characteristics, as compared with Comparative Examples 1 to 5, in which any of the proportion of Ni, the amount of transition metals in the Li layer, and the half width n of the diffraction peak of the (208) plane did not satisfy the above range. Comparative Examples 6 and 7, in which the proportion of Ni in the lithium transition metal oxide was less than 91 mol % relative to the total number of moles of metal elements except for Li, were high in capacity retention, but were inherently low in battery capacity and were not preferable for a positive electrode active material of a non-aqueous electrolyte secondary battery expected to be increased in capacity.

The invention claimed is:

1. A positive electrode active material for a non-aqueous electrolyte secondary battery, comprising:
a Ni-containing lithium transition metal oxide having a layered structure, wherein the lithium transition metal oxide has a crystallite size s in the range of 400 Å≤s≤500 Å, as calculated from a half width of a diffraction peak of the (104) plane, in an X-ray diffraction pattern with X-ray diffraction, according to the Scherrer's equation, and
a half width n of a diffraction peak of the (208) plane of the lithium transition metal oxide, in an X-ray diffraction pattern with X-ray diffraction, is 0.30°≤n≤0.50°.

2. The positive electrode active material for a non-aqueous electrolyte secondary battery according to claim 1, wherein the lithium transition metal oxide includes at least one element selected from the group consisting of Co, W, Nb, Mg, Ti, Mn, Zr and Mo.

3. The positive electrode active material for anon-aqueous electrolyte secondary battery according to claim 1, wherein the lithium transition metal oxide includes Al.

4. The positive electrode active material for a non-aqueous electrolyte secondary battery according to claim 1, wherein at least one element selected from the group consisting of Ni, Co and Mn is present in a Li layer of the layered structure.

5. A non-aqueous electrolyte secondary battery comprising a positive electrode including the positive electrode active material for a non-aqueous electrolyte secondary battery according to claim 1.

* * * * *